United States Patent Office 3,282,873
Patented Nov. 1, 1966

3,282,873
COMPOSITION COMPRISING THE REACTION PRODUCT OF A RESINOUS POLYESTER, HEXIONIC ACID, WATER AND AMMONIUM HYDROXIDE
George H. Slack, 7104 Hohman Ave., Hammond, Ind., and C. Roy Gleason, 5200 Sheridan Road, Chicago, Ill.
No Drawing. Filed Oct. 30, 1963, Ser. No. 319,949
9 Claims. (Cl. 260—22)

This invention relates to novel compositions of matter and to methods related to the production and use of these compositions. In particular, the invention is concerned with the production and use of resinous compositions and with the production and use of novel related materials.

It is one object of this invention to provide improved resinous compositions which are characterized by unique properties and which can be applied in a wide variety of uses.

It is a more particular object of this invention to provide improved resinous compositions which are particularly suitable for use as plasticizers either alone or in combination with other plasticizing compositions.

It is a further object of this invention to provide for the production of compositions related to the compositions noted in the foregoing object, said related compositions being characterized as dispersions or emulsions and being adapted for use in a wide variety of important applications.

These and other objects of this invention will appear hereinafter and for purposes of illustration but not of limitation, specific examples of the compositions and methods will be set forth.

The compositions of matter produced in accordance with the instant invention may be generally characterized as resinous compositions. In particular, the compositions comprise the reaction product resulting when phthalic anhydride and a member of the group consisting of propylene glycol and triethylene glycol are combined. The invention is also particularly concerned with the methods employed for producing the novel compositions of this invention.

The instant invention is also related to novel methods for producing compositions related to the above noted reaction products. Specifically, the instant invention provides for the production of a resin dispersion which is achieved by carrying out the above noted reaction and continuing the reaction through the addition of certain specific ingredients. These ingredients, including a novel compound to be hereinafter described, are included in a reaction characterized by certain specific steps which permit production of the desired resin dispersions.

It will be understood that the following examples which illustrate the compositions and methods of this invention are provided for illustrative purposes and various modifications of the described procedures will be obvious to those skilled in the art.

EXAMPLE I

In preparing one form of the resinous compositions of this invention, approximately stoichiometric amounts of phthalic anhydride and propylene glycol were heated together in an aluminum container. In this example, 85 parts by weight of phthalic anhydride and 60 parts by weight of propylene glycol were employed. The heating operation was confined to temperatures between about 400 and 425° F. for a period of about 20 minutes. The reaction was exothermic and was accompanied by frothing. The application of heat was controlled whereby the temperature did not rise above about 425° F. It was estimated that the reaction began at about 415° F. The frothing ceased upon completion of the reaction and, therefore, provided a visual means for determining the length of heating.

EXAMPLE II

In a separate operation, triethylene glycol was employed in place of the propylene glycol. An aluminum container was also employed in this example and the reaction characteristics and conditions were essentially the same as referred to in Example I.

The use of a container made of aluminum was found to be preferred in that a catalyzing effect on the reaction was observed.

The resin compositions resulting from the procedures referred to in the above examples were characterized by certain unique properties. The compositions were non-hard resins which were stiff but plastic at ordinary temperatures. They were characterized by a light yellow to light brown color and did not get hard even when cooled to 0° C.

The melting point of the resins was found to be between 58 and 69° C. at which temperature the composition ran as a thin liquid. When stored in cans or drums, the material is preferably heated to about 75° C. at which temperature it can be easily removed for use.

Other properties observed are listed below in:

TABLE A

Viscosity

Solution viscosities depend on the solvents chosen as well as concentrations used. A solution of 80% by weight of the compositions and 20% by weight acetone is as heavy as thick molasses at ordinary temperatures. A 50% by weight solution in 50% by weight of half and half acetone-ethanol is about water thin.

Compatibility

The compositions are compatible with cellulose acetate, nitrocellulose, ethyl cellulose, chlorinated rubber and the vinyls. Some glyptols, rezyls, and shellacs and Congo gums. Liquid plasticizers such as diethyl phthalate, dimethyl phthalate, dibutyl phthalate and triphenyl and tricresyl phosphates can be used in many types of solutions containing the compositions.

Dielectric value

The compositions have no great dielectric value and do not seriously impair that of celulose acetate in proportions used for plasticizing.

Acid number

The compositions acid numbers average about 65.

Toxicity

The compositions are non-toxic, practically ordorless and tasteless.

The compositions of this invention were found to be soluble in a wide variety of solvents, examples of which are listed below in Table B.

TABLE B

| Single Solvents | | Mixed Solvents | |
|---|---|---|---|
| Acetone | S | Acetone-Ethyl Acetate 50/50 | S |
| Ansol | PS | Ethyl Acetate-Methanol 50/50 | S |
| Diacetone | S | | |
| Diethyl Phthalate | S | Ethylene Dichloride-Ansol 50/50 | S |
| Dimethyl Phthalate | S | | |
| Dioxan | S | Ethylene Dichloride-Methanol 50/50 | S |
| Ethyl Acetate | S | | |
| Ethyl Alcohol—C.P. | PS | Ethylene Dichloride-Solox 50/50 | S |
| Ethyl Lactate | S | | |
| Ethylene Dichloride | S | Methanol Toluol 50/50 | S |
| Linseed Oil | SS | Methanol Toluol | S |
| Methanol | PS | | |
| Methyl Ethyl Ketone | S | | |

S—soluble; PS—partially soluble; SS—slightly soluble.

The compositions of this invention are suitable for a wide variety of uses. A particular use concerns the provision of the composition as an auxiliary plasticizer. Specifically, the composition of this invention can be employed in combination with plasticizers of the diethyl dimethyl and dibutyl phthalate type. The composition referred to in the above examples has been found to be compatible with plasticizers of the type described and can, therefore, be used as an improving ingredient for applications where the known plasticizers are recommended.

The compositions described in the above examples have also been advantageously employed as plasticizers for cellulose acetate, nitrocellulose and ethylcellulose without diethyl, dimethyl or dibutyl phthalates being present. When used as a plasticizer in this manner, the presence of other synethetic resins has not been found to be detrimental.

The instant invention is also concerned with the production of compositions which are related to the above noted novel compositions. Specifically, the instant invention is concerned with the production of materials which can be characterized as dispersions or emulsions. In the preparation of these related materials, a novel compound described in copending application Serial No. 274,836, filed April 22, 1963, and entitled "Composition of Matter and Method of Use" is employed. Reference is made to said copending application for a description of the characteristics and the method of preparation of this novel compound. For purposes of this description, this compound can be characterized as the reaction product obtained when mixing stoichiometric amounts of phosphoric acid, a polyhydric alcohol selected from the group consisting of sorbitol and mannitol, and water, and when heating this mixture to about 250° F. The novel compound is characterized by the empirical formula $C_6H_{20}O_{24}P_6$ (hexionic acid).

Examples of related compositions prepared in accordance with this invention are as follows:

EXAMPLE III 200 parts by weight of the resin composition of Example I was combined with 10 parts by weight of $C_6H_{20}O_{24}P_6$, (hexionic acid), 120 parts by weight water and 80 parts by weight ammonium hydroxide. The combination was heated to a temperature of about 400° F. and an emulsion resulted. The emulsion was characterized by extreme stability and uniformity.

EXAMPLE IV

In the preparation of the resin composition of Example II, a portion of the composition was recovered while in the molten state and $C_6H_{20}O_{24}P_6$ (hexionic acid) was added to this composition in a ratio of 10:200 parts by weight. 16 parts by weight of pelargonic acid, 140 parts by weight water and 60 parts by weight ammonium hydroxide were also combined in this reaction. Heating to a temperature of about 400° F. provided the desired stable and uniform emulsion.

The emulsions described in Examples III and IV have been found to have many important uses. Thus, the emulsion of Example III comprises a non-migrating resin plasticizer particularly useful as a plasticizer for casein, starch and xylenes. For example, in the clay coating of paper, the emulsion can be applied along with casein or starch, etc., in solution. The provision of the emulsion of this invention as a plasticizer eliminates brittleness in the clay coating and provides a more permanent and resistant coating.

The emulsions of this invention are also particularly suitable for use in the processing of newly formed paper. Thus, from 1 to 10 percent by weight of an emulsion formed in accordance with this invention can be introduced into the water boxes or tub sizing tanks conventionally employed in the production of paper. The provision of this material results in impregnation of the paper and materially improves the characteristics thereof.

The emulsion referred to in Example IV is employed where wetting of a material to be treated is desired. The pelargonic acid is thus excluded where penetration of the material to be treated is to be avoided.

It will be understood that various changes and modifications may be made in the above described concepts which provide the characteristics of this invention without departing from the spirit thereof particularly as defined in the following claims.

That which is claimed is:

1. A method for the production of a penetrating resin dispersion comprising the steps of combining a resin formed of phthalic anhydride and one member of the group consisting of propylene glycol and triethylene glycol with a composition having the empirical formula $C_6H_{20}O_{24}P_6$ (hexionic acid), pelargonic acid, water and ammonium hydroxide, and heating the combination at a temperature of at least about 400° F.

2. A method in accordance with claim 1 wherein said combination comprises about 200 parts by weight of said resin, about 10 parts by weight of said composition, about 16 parts by weight of said acid, about 120 parts by weight of water and about 80 parts by weight ammonium hydroxide.

3. A method for the production of a resin dispersion comprising the steps of combining a resin formed of phthalic anhydride and one member of the group consisting of propylene glycol and triethylene glycol with a composition having the empirical formula $C_6H_{20}O_{24}P_6$ (hexionic acid), water, and ammonium hydroxide, and heating the combination at a temperature of at least about 400° F.

4. A method in accordance with claim 3 wherein said combination comprises about 200 parts by weight of said resin, about 10 parts by weight of said composition, and about 120 parts by weight of water and about 80 parts by weight ammonium hydroxide.

5. A composition of matter comprising the reaction product resulting after combining stoichiometric proportions of a resin formed of phthalic anhydride and one member of the group consisting of propylene glycol and triethylene glycol with a compositon having the empirical formula $C_6H_{20}O_{24}P_6$ (hexionic acid) pelargonic acid, water, and ammonium hydroxide, and heating the combination at a temperature of at least about 400° F.

6. A composition of matter comprising the reaction product resulting after combining stoichiometric proportions of a resin formed of phthalic anhydride and one member of the group consisting of propylene glycol and triethylene glycol with a composition having the empirical formula $C_6H_{20}O_{24}P_6$ (hexionic acid), water, and ammonium hydroxide, and heating the combination at a temperature of at least about 400° F.

7. A plasticizer composition comprising the reaction product resulting after combining stoichiometric proportions of a resin formed of phthalic anhydride and one member of the group consisting of propylene glycol and trrethylene glycol with a composition having the empirical formula $C_6H_{20}O_{24}P_6$ (hexionic acid), pelargonic acid, water, and ammonium hydroxide, and heating the combination at a temperature of at least about 400° F.

8. A plasticizer composition comprising the reaction product resulting after combining stoichiometric proportions of a resin formed of phthalic anhydride and one member of the group consisting of propylene glycol and triethylene glycol with a composition having the empirical formula $C_6H_{20}O_{24}P_6$ (hexionic acid), water, and ammonium hydroxide, and heating the combination at a temperature of at least about 400° F.

9. A method for the production of a resin dispersion comprising the steps of combining a resin formed of phthalic anhydride and one member of the group consisting of propylene glycol and triethylene glycol with a composition consisting essentially of hexionic acid, pelargonic acid, water and ammonium hydroxide, and heating the combination at a temperature of at least about 400° F., said hexionic acid being prepared by mixing substantially stoichiometric amounts of phosphoric acid, a polyhydric alcohol selected from the group consisting of sorbitol and mannitol, and water, and heating the mixture to about 250° F.

References Cited by the Examiner

UNITED STATES PATENTS

| | | | |
|---|---|---|---|
| 1,890,668 | 12/1932 | Bradley | 260—75 |
| 3,139,450 | 6/1964 | Friedman | 260—75 |

FOREIGN PATENTS 540,708   5/1957   Canada.

MURRAY TILLMAN, *Primary Examiner.*

J. C. BLEUTGE, *Assistant Examiner.*